United States Patent [19]

Gordon

[11] 4,202,437
[45] May 13, 1980

[54] SCRAPER ASSEMBLY FOR A CONVEYOR BELT

[76] Inventor: James R. Gordon, 301 W. Boling St., Benton, Ill. 62812

[21] Appl. No.: 22,923

[22] Filed: Mar. 22, 1979

Related U.S. Application Data

[63] Continuation of Ser. No. 840,107, Oct. 6, 1977, abandoned.

[51] Int. Cl.$^2$ .............................................. B65G 45/00
[52] U.S. Cl. ................................. 198/497; 15/256.5
[58] Field of Search ............................. 198/497–499, 198/633, 635–637; 15/256.5, 51, 256.6; 74/230

[56] References Cited

U.S. PATENT DOCUMENTS

| | | | |
|---|---|---|---|
| 1,704,750 | 3/1929 | Lunn | 74/230 |
| 3,504,786 | 4/1970 | Matson | 198/499 |
| 3,822,642 | 7/1974 | Grindeland | 15/256.51 |
| 3,913,728 | 10/1975 | Pott | 198/498 |

FOREIGN PATENT DOCUMENTS

| | | | |
|---|---|---|---|
| 942497 | 5/1956 | Fed. Rep. of Germany | 198/499 |
| 2261661 | 6/1974 | Fed. Rep. of Germany | 198/497 |
| 1159738 | 7/1969 | United Kingdom | 198/499 |
| 1331222 | 9/1973 | United Kingdom | 198/499 |

*Primary Examiner*—Joseph E. Valenza
*Attorney, Agent, or Firm*—Kinzer, Plyer, Dorn & McEachran

[57] ABSTRACT

A conveyor belt scraper assembly having a scraper core attached to a shaft which holds the scraper core in adjustable spatial relationship with the conveyor belt, the scraper core having slide-in mounting channels which hold resilient scraper blades in contact with the conveyor belt to remove foreign matter therefrom and to allow expeditious replacement of worn-out blades, the scraper core also being rotationally and linearly adjustable to permit compensation for a substantial range of wear on the blade edge surface.

15 Claims, 10 Drawing Figures

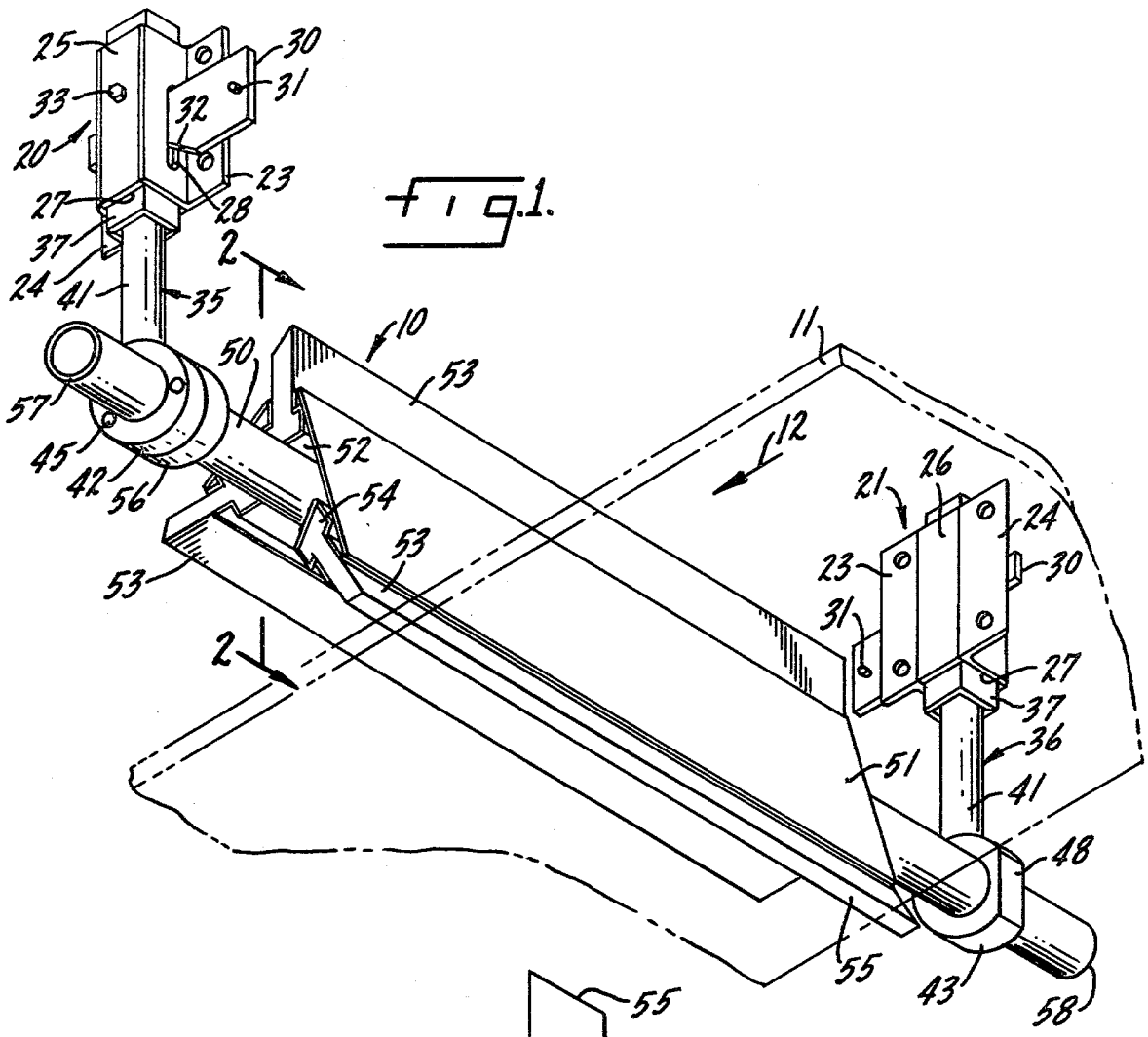
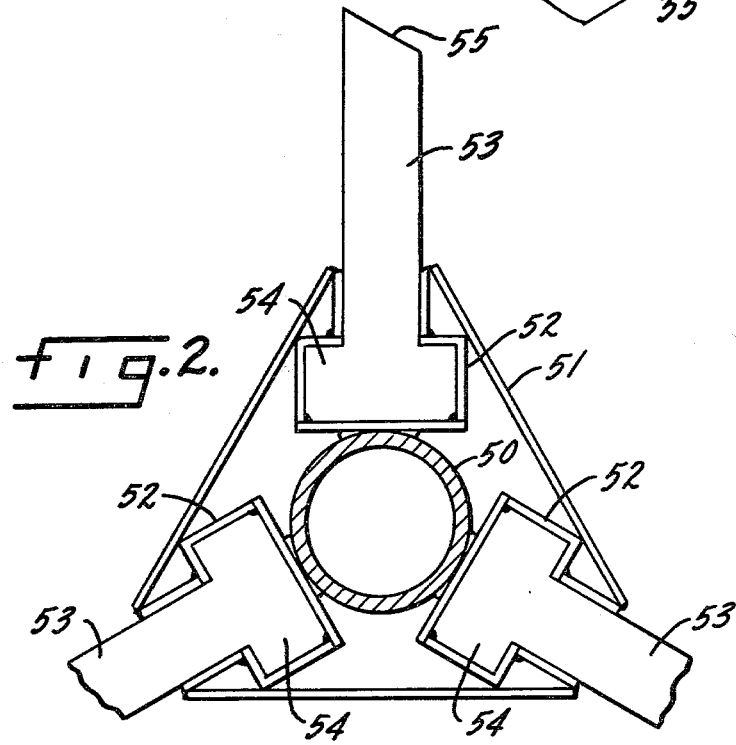

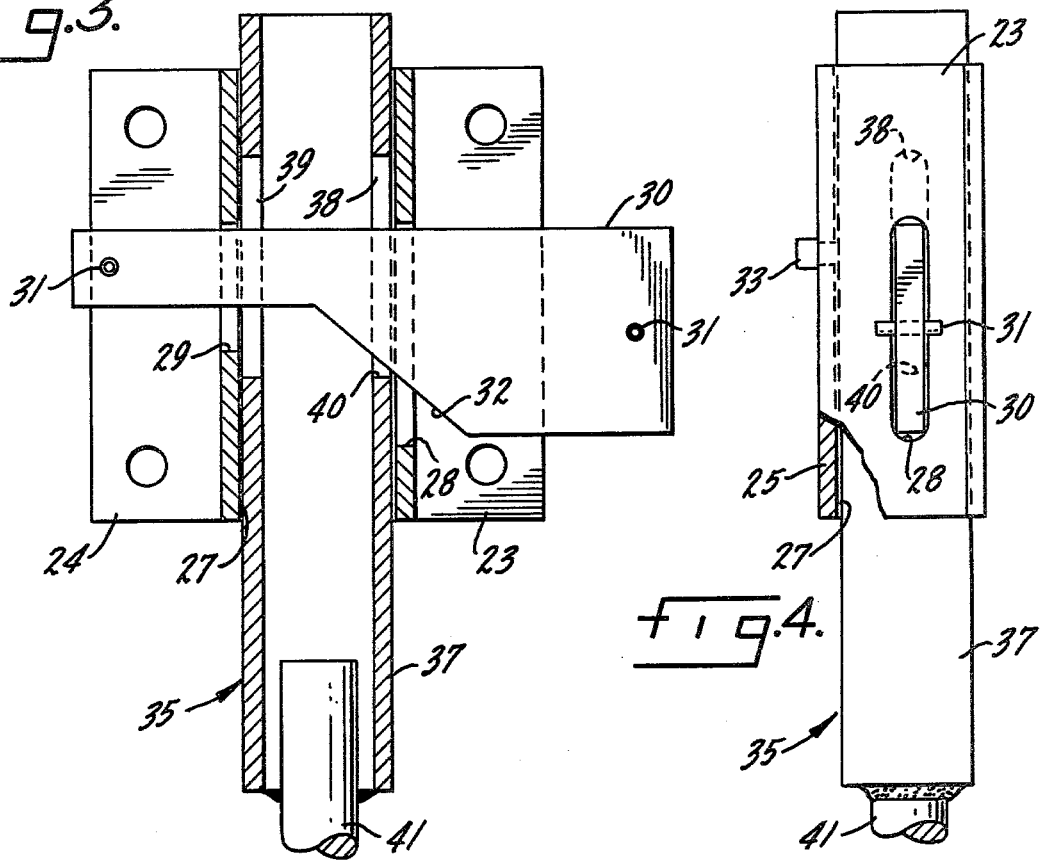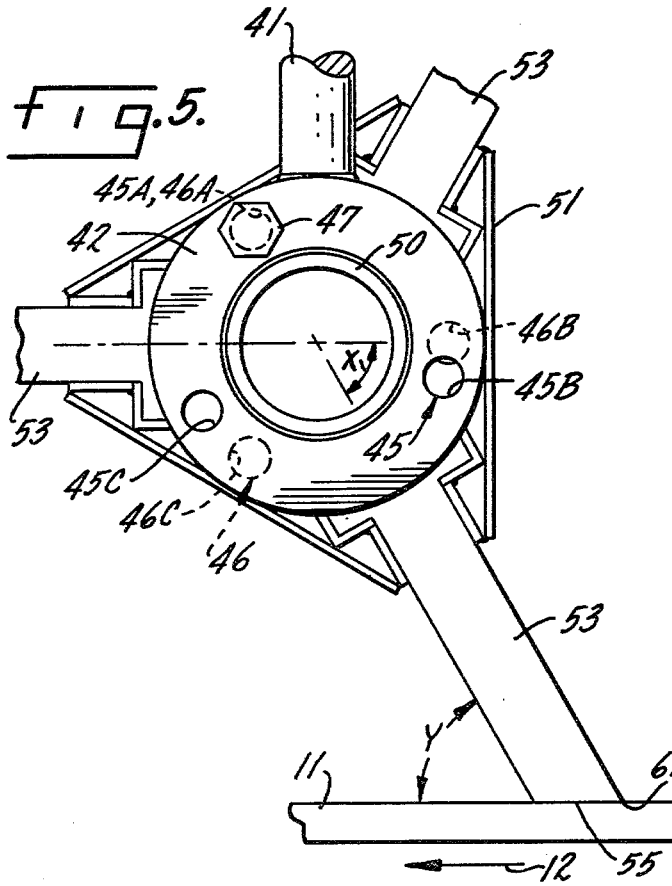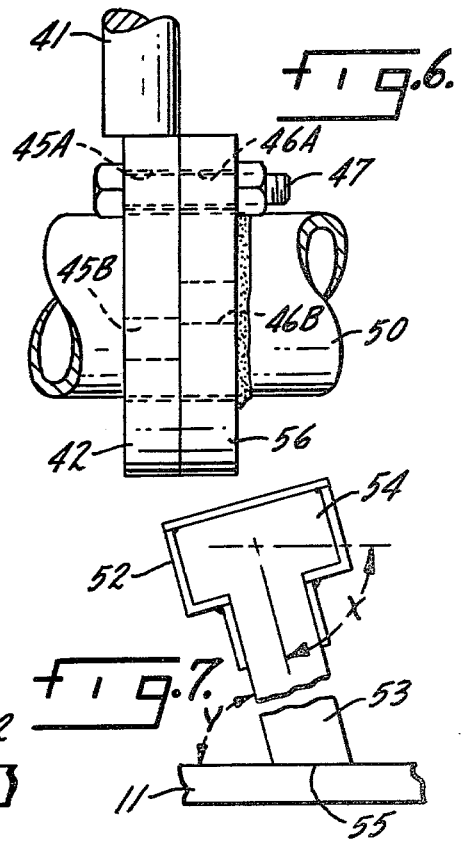

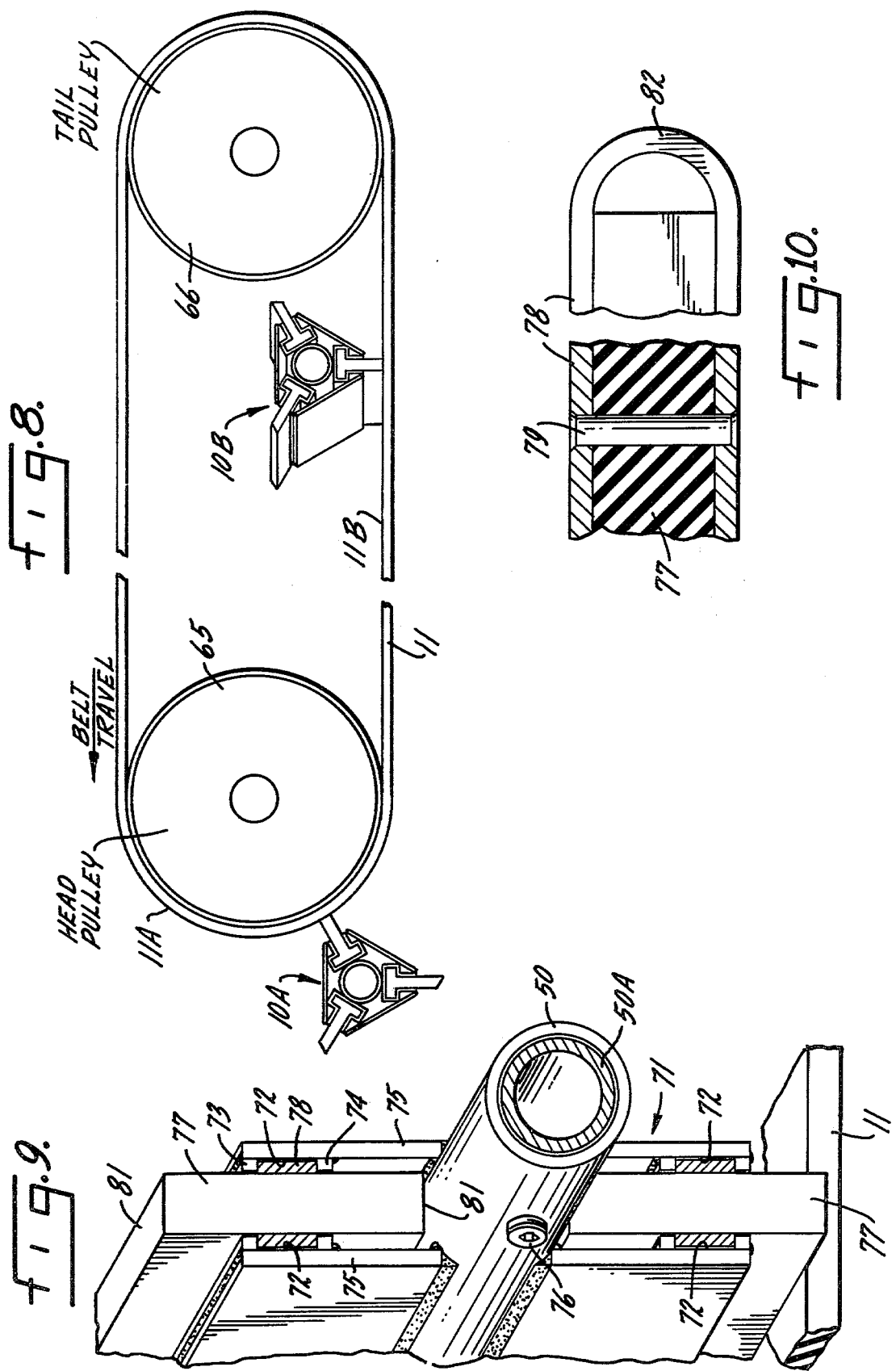

4,202,437

SCRAPER ASSEMBLY FOR A CONVEYOR BELT

This is a continuation of application Ser. No. 840,107, filed Oct. 6, 1977, now abandoned.

BACKGROUND OF THE INVENTION

This invention relates to equipment used to remove foreign matter from conveyor belts. Conveyor scrapers are used to remove debris in a controlled manner, to prevent it from creating unsafe conditions by accumulating on the belt. Frequently, such equipment must be used in hostile environments which create substantial maintenance problems. These problems include excessive wear on scraper blades, corrosion of blade mounting mechanisms, and the need for fast changeover to limit downtime. These difficulties are often exacerbated by a limited amount of space in which to perform maintenance operations. Also, the wear and corrosion problems operate in tandem to compound maintenance headaches by creating a need for frequent blade replacement but at the same time making it difficult to effect such replacement because mounting bolts and clamps have become corroded. These difficulties are particularly prevalent in coal mines and other mining operations, but may also be encountered in industrial applications.

Another difficulty with conveyor scraping equipment is that the scraper can damage the conveyor belt itself. This causes the shutdown of the entire material handling system while the belt is either repaired or replaced. Replacement of a conveyor belt is highly undesirable from an economic standpoint. It is much less expensive to be sure that the scraper assembly sustains the wear than it is to replace the conveyor belt.

Another disadvantage of some scraper designs is that they are limited to a single position in the conveyor line. This means space must be provided for the scraper either underneath the belt or at one particular pulley or another. This causes a lack of flexibility in the application of the scraper to the entire conveyor system.

SUMMARY OF THE INVENTION

It is an object of this invention to provide for ready replacement of worn-out conveyor belt scraper blades.

It is a further object of this invention to minimize conveyor belt wear by use of resilient scraper blades.

Still another object of this invention is the maximum utilization of the scraper blade to prolong blade life and thereby decrease the frequency of blade change operations. This is accomplished by providing for adjustable mounting angles to compensate for wear-related changes in the blade edge surface angle and by providing free adjustment at both ends of the blade to maintain belt contact along the width of the blade, as its surface is worn away.

Still another object of this invention is to provide a conveyor scraper that can be installed at any point in the conveyor system with no provisions necessary for special space or mounting facilities for the scraper.

The scraper assembly of this invention is mounted in a pair of slide housings which are located on the sides of the conveyor belt. Each slide housing has a slideway which is parallel to the other in a plane normal to the surface of the conveyor belt. A pair of support slides fit into the slideways with each support slide including a shaft support collar. The support slides are secured in the slideways by adjustable slide mounting means. A scraper shaft is held at its opposite ends by the shaft support collars so that the shaft extends across the conveyor belt in spaced relationship thereto. A scraper core is affixed to the scraper shaft and extends across the conveyor belt. Included in the scraper core are one or more longitudinal blade-mounting channels. A scraper blade fits in sliding interlocking engagement in the blade mounting channel of the scraper core to mount the blade on the core with the scraper edge surface in engagement with the full width of the conveyor belt. An annular flange is affixed to one end of the scraper shaft and is a part of an adjustable mounting means which secures the flange to one of the shaft support collars. This maintains the shaft in fixed axial position and in adjustable fixed angular orientation. Adjustment of the angular orientation of the shaft is effective to compensate for a substantial range of wear on the scraping edge of the blade.

BRIEF DESCRIPTION OF THE DRAWINGS

FIG. 1 is a perspective view showing the general arrangement of a scraper assembly with three blades in the scraper core;

FIG. 2 is a sectional view of the scraper shaft and scraper core, taken approximately along line 2—2 in FIG. 1;

FIG. 3 is a sectional front elevation view of a slide housing employed as a scraper support;

FIG. 4 is a side elevation view of the slide housing;

FIG. 5 is an end view of the scraper assembly looking down the axis of the scraper shaft and showing the blade in its initial position;

FIG. 6 is a side view of the adjustable mounting means with the annular flange arranged adjacent to one of the shaft support collars and connected by a position fixing bolt;

FIG. 7 is an end view of the scraper blade showing its position after it has been in operation and the scraper core has been rotated to compensate for wear on the blade edge surface;

FIG. 8 is a side elevation view of a preferred system using two scraper assemblies constructed in accordance with the invention;

FIG. 9 is a perspective view showing an alternate configuration of the scraper core, blade-mounting channels and blade-mounting elements; and FIG. 10 is a detail sectional view of the alternate blade-mounting element of FIG. 9.

DESCRIPTION OF THE PREFERRED EMBODIMENT

A conveyor scraper assembly 10 constructed in accordance with the present invention is shown in FIG. 1. The conveyor belt 11 travels in the direction shown by the arrow 12.

Two slide housings for supporting scraper assembly 10 are shown at 20 and 21 in FIG. 1. These housings are mounted on a fixed frame or support (not shown); the frame can be in any suitable location and configuration. It does not constitute a part of this invention. Each slide housing is formed from two opposing brackets 23 and 24 which are separated and rigidly connected by front and rear gusset plates 25 and 26 respectively (FIG. 1). Together, the brackets and gusset plates form the slideway 27 (FIGS. 1 and 3). Vertical slots 28 and 29 are cut in the opposed surfaces of the brackets 23,24, and a wedge 30 fits into these slots. The wedge 30 can slide horizontally in slots 28 and 29, and is prevented from falling out of the slide housing by retaining pins 31 (FIGS. 1, 3 and 4). The wedge has an angled surface 32 facing in the direction of the conveyor belt 11. A set screw 33 fits in a hole in the front gusset plate 25 (FIGS. 1 and 4). Together the wedge, the retaining pins, the angled surface of the wedge, and the set screw form the slide mounting means.

Two support slides 35 and 36 fit into the slideways 27 (FIG. 1). In the preferred embodiment the slideways are rectangular so the support slides are each fitted with a rectangular head 37. The head is fixedly attached to an arm 41 (FIGS. 1,3,4) which extends downwardly to a point where it attaches to one of two shaft support collars 42 and 43 (FIG. 1). Shaft support collar 42 has a plurality of bolt holes 45. Shaft support collar 43 has a truncated surface 48 along a chord of one side of the collar.

A scraper shaft 50 extends across the conveyor belt with its opposite ends extending through the shaft support collars (FIG. 1). The shaft is thereby held in spaced relation to the conveyor belt 11. The shaft extends through and supports a scraper core 51. The core is rigidly attached to the shaft. The scraper core 51 has a width sufficient to allow the ends of the core to extend slightly beyond the edges of the conveyor belt 11. Formed in the scraper core are three longitudinal blade-mounting channels 52 (FIGS. 1,2). These channels extend the full width of the scraper core. A scraper blade is shown at 53. The blade has a T-shaped integral mounting element 54 formed at one edge. The blade is inserted into the blade-mounting channel in sliding interlocking engagement with the scraper core. This mounts the blade on the core with the scraper edge surface 55 in contact with the full width of the conveyor belt.

Each scraper blade 53 should be molded or otherwise formed of material that is at least somewhat resilient. In many applications, relatively hard yet resilient rubber, urethane, or other elastomer, molded to afford the requisite mounting element 54 integral with the blade 53, is the preferred material. Molded resin blades are also frequently quite satisfactory. On the other hand, a metal scraper blade can also be used in the present invention, particularly if the belt 11 has a surface that can withstand continuing contact with a metal scraper over long periods of time. Thus, the choice of material for blades 53 is, in part at least, dependent upon the material and wear characteristics of the belt 11.

An annular flange 56 is mounted toward one end of the scraper shaft (FIG. 1). This end will be called the flanged end 57 and the opposite end the free end 58. The flange 56 is rigidly attached to the shaft 50 and fits in a position immediately adjacent to the shaft support collar 42. Although they are not visible in FIG. 1, the annular flange also has a plurality of bolt holes 46 (see FIG. 5). A selected pair of bolt holes, one hole 45 in the shaft support collar and another hole 46 in the annular flange, receives a position-fixing bolt 47 (FIGS. 5 and 6). The position-fixing bolt 47 prevents axial displacement of the shaft 50 relative to the support collars 42 and 43 and also prevents any rotational motion of the shaft.

One preferred configuration of the scraper shaft 50 and scraper core 51 is shown in FIG. 2. While this arrangement has three T-shaped blade-mounting channels 52 spaced 120° apart, the core could provide one or two channels instead. A single blade core could be used, for example, in systems having severe space limitations.

The details of the support slide head 37 and the slide mounting means can be seen in FIGS. 3 and 4. Two vertical slots 38 and 39 are cut in the sides of the slide head 37. These are aligned with the vertical slots 28 and 29 to permit insertion of the wedge 30. The inside edge 40 of the slot 38 is in contact with the angled surface 32 of the wedge 30.

In operation, the scraper assembly 10 is stationary. But the advantages of this invention become most apparent during set-up and blade changing operations. Initial set-up can be accomplished in a compact space using the following end-to-end technique. First, the support slide 36 is inserted into slideway 27 of slide housing 21 (FIG. 1). The free end 58 of scraper shaft 50 is then inserted through shaft support collar 43 and the shaft is displaced to the right by sliding it through the collar 43 until the scraper core 51 contacts the support slide 36. The resulting offset clears the flanged end 57 of the shaft from the space beneath slide housing 20. This permits insertion of support slide 35 into its slideway 27. Shaft support collar 42 receives the flanged end 57 when the shaft 50 is moved axially to the left to its centered position.

The annular flange 56 and support collar 42 then are connected by position-fixing bolt 47 to lock the shaft in its axial position and fix the initial blade mounting angle. The final step in setting up the scraper assembly is the emplacement of the slide mounting means. This simply entails sliding the wedge 30 through slots 28 and 29 and slots 38 and 39 until the angled surface 32 is jammed up against the inside edge 40 of the slot 38 (FIG. 3). Set screw 33 is then tightened to lock the support slide in place. The overall mounting arrangement then is a compression fit of the assembly 10 between the conveyor belt 11 and the wedges 30. Full adjustability is achieved as the wedge location determines the depth to which the support slides 34 and 36 can penetrate into the slideway. For limited wear adjustment, wedges 30 can be tapped in periodically as a part of regular maintenance to keep the blade tight against the conveyor belt. Continuous adjustment for limited wear can also be achieved by spring loading the support slide arm 41. Preferably, the spring would be fully enclosed in a sleeve which fits inside of and is rigidly attached to the rectangular head 37 while the arm 41 is left free to slide in the sleeve. Also, independent adjustments can be made at either end of the shaft to compensate for unevenness of wear along the width of the blade.

One of the advantages of this invention is the provision for rotational adjustment of the blade to compensate for major wear. This prolongs blade life, resulting in savings in blade costs and downtime for blade changeover. A preferred embodiment of this adjustable mounting means is shown in FIGS. 5 and 6. The scraper core 51 has three blades 53, all 120° apart. Matched pairs 45A-46A, 45B-46B and 45C-46C of bolt holes are provided in the shaft support collar 42 and annular flange 56. In the initial position for a new blade 53 the pair 45A-46A are aligned and the position fixing bolt 47 is inserted therein. This provides for a sixty degree blade mounting angle X. The blade mounting angle is the angle the blade makes with a horizontal plane through the support shaft axis. A new blade 53 has its edge surface 55 bevelled to form an edge surface angle Y. The edge surface angle is the acute angle formed by the blade and the edge surface. Initially, the edge surface angle Y is equal to the blade mounting angle X.

After a certain amount of use the leading edge 62 of the scraper edge surface 55 becomes worn away. This increases the edge surface angle Y and lowers the efficiency of the scraping, as less of the edge surface 55 is in contact with the conveyor belt. To compensate for this wear, the blade mounting angle can be changed by removing the position-fixing bolt 47 and rotating the annular flange 56, which in turn will rotate the shaft 50 and the blade assembly. As shown in FIG. 5 the second matched pair of bolt holes 45B-46B is initially offset fifteen degrees, so when they are aligned the blade mounting angle X becomes 75°; see FIG. 7. This causes the blade mounting angle X to more closely approximate the edge surface angle Y, thereby maximizing contact of the worn blade surface 55 with the belt 11. Further use wears away the scraper edge surface 55 until the edge surface angle Y approaches 90°. The mounting angle can then be changed to a third setting by aligning the matched pair of bolt holes 45C-46C. This provides a 90° blade mounting angle.

When one blade 53 is worn to a point of diminishing utility, a new blade can be put in operation by a simple rotation of the shaft 50 to align holes 45A and 46C. Now there is a new blade 53 with a different set of matched pairs of bolt holes, but the rotational adjustment is the same due to the symmetry of the blade arrangement. Thus, three blades are used in three positions each before a blade changeover is required.

Since the blades 53 are deliberately designed to absorb most of the wear in the scraping operation, in order to prevent damage to the more expensive conveyor belt, blade changeovers are eventually required. These are readily accomplished with this invention. To replace a blade, the first step is to loosen the wedges 30, which allows the scraper shaft 50 to be moved away from the belt. Next, the position-fixing bolt 47 is removed. This permits the free rotation of the scraper shaft 50 and core 51. The core is rotated until one blade-mounting channel 52 with a worn-out blade is in line with the truncated surface 48 of the shaft support collar 43. The truncated surface provides clearance so that the worn-out blade 53 can slide out of the blade-mounting channel 52. A new blade is inserted into the channel in the same manner. No special tools are needed, nor are there any bolts or clamps in a position where they might become corroded and difficult to remove. When all three blades have been replaced the shaft is rotated until a fresh blade is in contact with the belt and the position fixing bolt and wedges are replaced, thereby again locking the scraper assembly in position to clean the conveyor belt. Since all of these operations can be performed in a short time, the downtime for the conveyor belt due to blade changeover is kept to a minimum.

It will be understood that a scraper assembly can be utilized in any location along the conveyor belt. Equal effectiveness can be achieved on the forward or return sides of the belt. Also, if more efficient cleaning is desired, two or more scraper assemblies can be installed on the same belt.

The scraper assembly can be easily adapted to act as a plow in removing material from the conveyor belt. To this end, the slide housings 20 and 21 may be offset in a horizontal direction so that the shaft 50 is supported at an angle across the conveyor belt. The shaft support collars 42 and 43 are rotated in their mounting on the arms 41 to provide for a plow configuration.

A preferred scraper-plow arrangement, utilizing two scraper assemblies constructed in accordance with the present invention, is shown in FIG. 8. In that arrangement, a first scraper assembly 10A is located in engagement with the outer surface 11A of the conveyor belt 11 at a point on the belt where it is engaged by the head pulley 65 of the conveyor. Preferably, scraper assembly 10A is aligned across belt surface 11A normal to the direction of belt travel.

A second scraper assembly 10B is incorporated in the system of FIG. 8, engaging the inner surface 11B of the conveyor belt. The scraper assembly 10B is aligned at an acute angle to the direction of belt travel; it functions as a plow scraper. Preferably, the plow scraper is located adjacent the tail pulley 66 of the conveyor. This particular dual-scraper arrangement, FIG. 8, has been found to be particularly efficient and effective in coal mining operations.

A preferred variation in the blade-mounting channel and mounting element configuration is shown in FIG. 9. A dual-blade scraper core 71 is provided with four rectangular blade-mounting channels 72. Two channels in facing relation to each other are required to mount each blade. The channels 72 are each defined by two shoulders 73 and 74 which extend the width of the core and are affixed to the inside surfaces of core plates 75 attached to the scraper shaft 50. Shaft 50 is shown as having an end extension 50A interlocked with the main portion of the shaft by suitable means such as a set screw 76.

The blade 77 for this embodiment is fitted with a mounting bar 78 along the midline on each side of the blade. The mounting bar width is slightly less than the separation between shoulders 73 and 74 so the bar can slide between them. The mounting bars 78 can be formed from a single piece of strap material wrapped around the end of the blade 77 and held in place by rivets 79, as shown in FIG. 10. As before, blade 77 is inserted into the core 71 with the mounting bars 78 in sliding interlocking engagement with the blade mounting chambers 72 formed by shoulders 73,74 and core plates 75.

An advantage of the mounting arrangement of FIGS. 9 and 10 is that two working edge surfaces 81 are available on each blade 77. When one surface 81 is worn to a point of diminishing utility, reversing the mounting of blade 77 brings the other working surface into use. This affords maximum utilization of blade material. Further, if the bar 78 is formed from a continuous strap material, a hook 82 is formed at the end of the blade (FIG. 10). This can be used as a convenient attachment point for pulling the blade out of the core 71. Of course, in the blade for the embodiment of FIGS. 9 and 10 it is not essential that the blade mounting elements 78 be formed separately from the body of the blade; an integral construction like that of the previously described embodiments could be used.

I claim:

1. A scraper assembly for a conveyor belt comprising:
   a pair of slide housings mounted adjacent opposite sides of the conveyor belt, each slide housing having a slideway, the two slideways being aligned parallel to each other in a plane transverse to the plane of the conveyor belt;
   a pair of support slides, each slidably mounted in one of the slideways, each support slide including a shaft support collar;
   releasable slide mounting means for securing each support slide in fixed position in its slideway;

a scraper shaft, having its opposite ends projecting through and supported by the shaft support collars, extending across the conveyor belt in spaced relation thereto;

a scraper core, affixed to the scraper shaft, extending across the conveyor belt, and including a longitudinal blade-mounting channel;

a scraper blade, having a scraper edge surface and a mounting element, the mounting element fitting in sliding interlocking engagement into the blade-mounting channel in the scraper core to mount the blade on the core with the scraper edge surface in engagement with the full width of the conveyor belt;

an annular flange affixed to one end of the scraper shaft;

and adjustable flange mounting means for securing the annular flange to one of the shaft support collars to maintain the shaft in fixed axial position and in one of a plurality of fixed angular orientations, adjustment of the angular orientation of the shaft being effective to compensate for a substantial range of wear on the scraper edge surface of the blade.

2. A scraper assembly for a conveyor belt in accordance with claim 1, in which the scraper blade is made of a molded resilient material such as hard rubber or urethane with an integral mounting element formed in the blade.

3. A scraper assembly for a conveyor belt, in accordance with claim 1, in which one of the shaft support collars is truncated along a chord on one side of the collar to provide clearance which affords access to the blade-mounting channels for removal of worn-out blades and replacement with new blades.

4. A scraper assembly for a conveyor belt, in accordance with claim 1, in which the adjustable flange mounting means comprises:

a position-fixing bolt, a plurality of bolt holes in the annular flange, and a plurality of bolt holes in the immediately adjacent support collar which when aligned permit insertion of the position-fixing bolt to connect the flange and collar, the bolt holes being arcuately spaced such that when one bolt hole of the annular flange is aligned with one bolt hole of the support collar, the remaining bolt holes are offset by selected rotational arcs so that selective alignment of a particular pair requires a rotation of the scraper shaft, thus permitting adjustable rotational orientation of the scraper shaft which in turn adjusts the mounting angle of the scraper blade.

5. A scraper assembly for a conveyor belt, in accordance with claim 1, in which the slide housing is formed by two opposing brackets separated and rigidly connected by front and rear gusset plates, one face of each bracket and the gusset plates forming the slideway into which the support slide fits, the other bracket faces being rigidly attached to an external base or frame.

6. A scraper assembly for a conveyor belt, in accordance with claim 5, in which the slide mounting means comprises a wedge which is horizontally movable in vertical slots in the brackets, the angled surface of the wedge forming a block which abuts against slots in the support slide to hold the scraper assembly in compression between the housing and conveyor belt, and a set screw, threaded through the front gusset plate and contacting the wedge to prevent vibration from shifting the horizontal position of the wedge.

7. A scraper assembly for a conveyor belt, in accordance with claim 1, in which the scraper core has two or more longitudinal blade-mounting channels, each with a scraper blade mounted therein, and arranged so that when one blade becomes worn a new blade can be engaged by a rotation of the scraper shaft.

8. A scraper assembly for a conveyor belt, in accordance with claim 1, in which the slide housings are horizontally offset so that the scraper shaft and blade are set oblique to the belt travel direction, this arrangement causing the blade to act as a plow in removing material from the conveyor belt.

9. A scraper assembly for a conveyor belt, in accordance with claim 1, in which the scraper edge surface is bevelled to form an edge surface angle which is initially equal to the acute mounting angle formed by the plane of the blade and a horizontal plane through the axis of the scraper shaft, such initial mounting angle being an acute angle, with the mounting angle being adjustable to a greater angle as the edge surface angle changes to compensate for blade wear.

10. A scraper assembly for a conveyor belt, in accordance with claim 1, in which the scraper blade has two opposed scraper edge surfaces, and the blade mounting element is located on the side of the scraper blade midway between the scraper edge surfaces, extending longitudinally of the blade.

11. A scraper assembly for a conveyor belt, in accordance with claim 10, in which the scraper blade is formed of molded elastomer material and the blade mounting element comprises a metal strap secured to the blade.

12. A scraper system for a conveyor belt, comprising two scraper assemblies, each constructed in accordance with claim 1, engaging the opposite surfaces of the conveyor belt at spaced locations.

13. A scraper system for a conveyor belt, according to claim 12, in which the first scraper assembly engages the outer surface of the belt adjacent the head pulley and the second scraper assembly engages the inner surface of the belt adjacent the tail pulley.

14. A scraper system for a conveyor belt, according to claim 13, in which the second scraper assembly is aligned at an oblique angle to the direction of belt movement to function as a plow scraper.

15. A scraper blade subassembly for a conveyor belt scraper assembly comprising a scraper core including two similar elongated blade-mounting channels in parallel spaced relation to each other and mounting means for mounting the the scraper core adjacent a conveyor belt with the blade-mounting channels extending across the belt in spaced relation thereto, the mounting means including means to adjust the position of the scraper core to compensate for wear on a scraper blade, the scraper blade subassembly comprising:

a flat scraper blade of resilient elastomer material;

two mounting elements, each consisting of a flat metal strip substantially narrower than the scraper blade;

the two mounting elements are formed by a continuous metal strip bent around one end of the scraper blade to form a hook for insertion of the assembly into the blade-mounting channels and removal therefrom;

a plurality of fasteners securing the mounting elements to opposite sides of the longitudinal center portion of the scraper, the fasteners being approximately flush with the outer surfaces of the mounting elements;

the mounting elements of the scraper subassembly fitting, interchangeably, into the blade-mounting channels of the scraper core in sliding interlocking engagement therewith to position the blade so that one edge of the blade projects from the blade-mounting channel toward engagement with the conveyor belt, the subassembly being reversible in the scraper core to provide for use of both scraper blade edges with the mounting elements remaining in place on the blade.

* * * * *